(12) United States Patent
Kamperman et al.

(10) Patent No.: US 9,843,834 B2
(45) Date of Patent: Dec. 12, 2017

(54) DIGITAL RIGHTS MANAGEMENT METHOD AND SYSTEM

(75) Inventors: Franciscus Lucas Antonius Johannes Kamperman, Eindhoven (NL); Willem Jonker, Eindhoven (NL); Petrus Johannes Lenoir, Eindhoven (NL); Sebastiaan Antonius Fransiscus Arnoldus Van Den Heuvel, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1189 days.

(21) Appl. No.: 10/514,901

(22) PCT Filed: May 21, 2003

(86) PCT No.: PCT/IB03/01940
§ 371 (c)(1),
(2), (4) Date: Nov. 17, 2004

(87) PCT Pub. No.: WO03/098931
PCT Pub. Date: Nov. 27, 2003

(65) Prior Publication Data
US 2005/0210261 A1 Sep. 22, 2005

(30) Foreign Application Priority Data
May 22, 2002 (EP) .................................... 02076998

(51) Int. Cl.
*H04N 21/436* (2011.01)
*G06F 21/10* (2013.01)
(Continued)

(52) U.S. Cl.
CPC ....... *H04N 21/43615* (2013.01); *G06F 21/10* (2013.01); *H04L 12/2805* (2013.01);
(Continued)

(58) Field of Classification Search
None
See application file for complete search history.

(56) References Cited

U.S. PATENT DOCUMENTS 7,062,500 B1* 6/2006 Hall et al. .................. 707/102
7,188,224 B2* 3/2007 Ohta et al. .................. 711/163
(Continued)

FOREIGN PATENT DOCUMENTS

DE 10035598 2/2002
JP H0289255 A 3/1990
(Continued)

OTHER PUBLICATIONS

Xu, Changsheng, Zhu, Yongwei, D.D., Feng, "Content Protection and usage control for digital music," Nov. 23-24, 2001, Web Delivering of Music, 2001, pp. 43-50.*
(Continued)

*Primary Examiner* — Kaveh Abrishamkar

(57) ABSTRACT

A method of controlling access to a content item in a domain comprising a set of mutually authenticated devices, the method comprising deriving one or more domain-specific rights from a right associated with the content item, the one or more domain-specific rights being bound to the domain and allowing the devices in the domain access to the content item. Also system comprising a set of mutually authenticated devices, said set making up a domain, the system comprising a central rights manager arranged for executing said method.

25 Claims, 4 Drawing Sheets

(51) Int. Cl.
*H04L 12/28* (2006.01)
*H04N 7/16* (2011.01)
*H04N 21/4367* (2011.01)
*H04N 21/4627* (2011.01)

(52) U.S. Cl.
CPC ......... *H04N 7/163* (2013.01); *H04N 21/4367* (2013.01); *H04N 21/4627* (2013.01); *H04L 12/2838* (2013.01)

(56) References Cited

U.S. PATENT DOCUMENTS

| | | | |
|---|---|---|---|
| 7,200,869 B1* | 4/2007 | Hacherl et al. | 726/27 |
| 2001/0042043 A1* | 11/2001 | Shear et al. | 705/51 |
| 2002/0077909 A1* | 6/2002 | Kanojia et al. | 705/14 |
| 2002/0157002 A1* | 10/2002 | Messerges et al. | 713/155 |
| 2002/0186844 A1* | 12/2002 | Levy et al. | 380/231 |
| 2003/0078891 A1* | 4/2003 | Capitant | 705/57 |

FOREIGN PATENT DOCUMENTS

| | | |
|---|---|---|
| JP | H09245010 A | 9/1997 |
| JP | 2002007408 A | 1/2002 |
| JP | 2002123498 A | 4/2002 |
| JP | 2003209884 A | 7/2003 |
| KR | 20010050111 A | 6/2001 |
| WO | 0217316 A1 | 2/2002 |
| WO | 0265255 A2 | 8/2002 |
| WO | 03047204 A2 | 6/2003 |
| WO | 03083627 A2 | 10/2003 |
| WO | 03092264 A1 | 11/2003 |

OTHER PUBLICATIONS

Hartung, F., Ramme, F., "Digital Rights Management and Watermarking of Multimedia Content for M-Commerce Application," Nov. 2000, Communications Magazine, IEEE, vol. 38, Issue 11, pp. 78-84.*

Garnett, Nic, "Digital Rights Management, Copyright, and Napster," Mar. 2001, ACM SIGecom Exchanges, vol. 2, Issue 2, pp. 1-5.*

"Calls for Proposals for Content Protectioin & Copy Management Technologies", DVB Technical Module Sub-Group on Copy Protection Technologies, Jul. 5, 2001, XP002230687.

Kamperman et al: "Digital Rights Management in Home Networks"; Philips Research, The Netherlands IBC 2001 Conference Publication, vol. I, pp. 70-77.

* cited by examiner

DIGITAL RIGHTS MANAGEMENT METHOD AND SYSTEM

The invention relates to a method of controlling access to a content item in a domain comprising a set of mutually authenticated devices. The invention further relates to a system comprising a set of mutually authenticated devices, said set making up a domain.

INTRODUCTION TO THE INVENTION

In recent years, the amount of content protection systems is growing in a rapid pace. Some of these systems only protect the content against illegal copying, while others are also prohibiting the user to get access to the content. The first category is called Copy Protection (CP) systems. CP systems have traditionally been the main focus for consumer electronics (CE) devices, as this type of content protection is thought to be cheaply implemented and does not need bi-directional interaction with the content provider. Some examples are the Content Scrambling System (CSS), the protection system of DVD ROM discs and DTCP, the protection system for IEEE 1394 connections.

The second category is known under several names. In the broadcast world, systems of this category are generally known as conditional access (CA) systems, while in the Internet world they are generally known as Digital Rights Management (DRM) systems.

Some type of CP systems can also provide services to interfacing CA or DRM systems. Examples are the systems currently under development by the DVB-CPT subgroup and the TV-Anytime RMP group. The goal is a system in which a set of devices can authenticate each other through a bi-directional connection. Based on this authentication, the devices will trust each other and this will enable/allow them to exchange protected content. The accompanying licenses describe which rights the user has and what operations he is allowed to perform on the content. The license is protected by means of some general network secret, which is only exchanged between the devices within a certain household. This network of devices is called an Authorized Domain (AD).

The concept of authorized domains tries to find a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks. Of course, other scenarios are also possible. A user could for example take a portable television with him on a trip, and use it in his hotel room to access content stored on his Personal Video Recorder at home. Even though the portable television is outside the home network, it is a part of the user's authorized domain.

A home network can be defined as a set of devices that are interconnected using some kind of network technology (e.g. Ethernet, IEEE 1394, BlueTooth, 802.11b, . . . ). Although network technology allows the different devices to communicate, this is not enough to allow devices to interoperate. To be able to do this, devices need to be able to discover and address the functions present in the other devices in the network. Such interoperability is provided by home networking middleware (HN-MW). Examples of home networking middleware are Jini, HAVi, UPnP, AVC.

The use of network technology and HN-MW allows one to view a set of individual devices as one large virtual device. From a HN-MW point of view, a network can be seen as a set of functions that can be used and connected. Such a system provides a user with capabilities to address any content or service from anywhere in the home network.

HN-MW can be defined as a system that provides two services. It allows an application in the network to locate devices and functions in the network. Furthermore, some kind of mechanism, such as remote procedure calls (RPC), defines how to use these functions.

From a HN-MW point of view, systems related to handling secure content appear in several ways. Certain functions in the network require access to protected content. Other functions in the network provide functionality that can be used by the elements in the network handling content security. Furthermore, security frameworks like OPIMA can use the HN-MW to locate each other and communicate in an interoperable way. Of course authorized domains can also be implemented in other ways.

For a more extensive introduction to the use of DRM in home networks, see F. L. A. J. Kamperman, S. A. F. A. van den Heuvel M. H. Verberkt, Digital Rights Management in Home Networks, Philips Research, The Netherlands, IBC 2001 conference publication vol. I, pages 70-77.

Various systems already exist that implement the concept of authorized domains to some extent. Examples of such systems are SmartRight (Thomson Multimedia), xCP (4C, mainly IBM), and NetDRM (Matshushita).

The SmartRight system has, amongst others, the following properties:

Smart cards can be inserted in all devices.
The system uses authentication of those smart cards.
The system uses a common network secret.
New smart cards added to the domain will receive the network secret.
All smart cards can open the licenses (=rights) in the domain.

The xCP system has, amongst others, the following properties:

Uses common network secret (key space).
Key spaces based on MKB structure.
When devices are added, the key spaces are merged.
Also a new common secret (Media_key) is then generated.
All licenses are re-encrypted with the new secret.
A central domain manager decides if merger is allowed.

The NetDRM system has, amongst others, the following properties:

A central server to register device to domain. This server can be at home or in the outside network.
Uses network (domain) secret.
Secret is distributed from central server, which could also be in the home.
Licenses are typically stored in the outside network, but may also be stored locally.

Virtual Private Networks (VPNs) could to some extent be considered similar, but their purpose and therefore their implementation is different. Roughly it can be said that the purpose of VPNs is to keep internally generated content in the network (typically accessible in the whole network), while authorized domains try to keep externally generated content (such as purchased copyrighted content) in the domain (typically accessible in the whole domain).

SUMMARY OF THE INVENTION

It is an object of the invention to provide a method of controlling access to a content item in a domain comprising a set of mutually authenticated devices, which is flexible with respect to handling content and rights associated with content.

This object is achieved according to the invention in a method comprising deriving one or more domain-specific rights from a right associated with the content item, the one or more domain-specific rights being bound to the domain and allowing the devices in the domain access to the content item. Preferably the devices in the domain receive the domain-specific rights from a central rights manager device in the domain, although decentralized rights distribution or other solutions are also possible. The number of domain-specific rights may be limited to a predetermined amount This may apply to all domain-specific rights or just to those of the 'playback' type. This allows unlimited copying but limits simultaneous playback.

In an embodiment the one or more domain-specific rights are revoked if the right associated with the content item is revoked or removed from the domain. This way it is not possible to exercise the domain-specific rights if there exists no valid corresponding right associated with the content item.

The content item may be stored on a removable storage medium together with the right associated with the content item. In that case, the one or more domain-specific rights might be derived only if the removable storage medium indicates that making a one-generation copy is permitted. Alternatively, they are derived only if the removable storage medium indicates that making a single copy of the content item is permitted. This way of deriving domain-specific rights is in line with the permissions (rights) indicated on the removable storage medium.

Another option is to derive the one or more domain-specific rights even though the removable storage medium indicates that making a copy of the content item is not permitted, or is no longer permitted (referred to as "copy no more" content). These options make it possible to use content on a removable storage medium such as a Compact Disc or Digital Versatile Disc freely within the domain, even when the right on the disc are more restrictive. Because the domain-specific rights are bound to the domain, there is no risk that users are able to access the content item outside the domain.

In an embodiment the right associated with the content item is a right that can be exercised a predetermined number of times, and the number of domain-specific rights derived from the right associated with the content item corresponds to the predetermined number. This provides an easy mapping of content-bound rights to domain-bound rights. The one or more domain-specific rights derived from the right associated with the content item could then be rights that can be exercised a predetermined number of times, preferably one time. This has the advantage that use of the domain-specific rights is very limited, allowing a great amount of control over access to the content item. Further, the problem that the domain-specific right may exist while the right associated with the content item has expired or has become invalid for another reason is now minimized.

The predetermined number of times the one or more domain-specific rights can be exercised could be indicated by the right associated with the content item, or be a characteristic of the domain or of the device through which the content item is imported into the domain. For instance the predetermined number could be proportional or inversely proportional to the size of the domain. A large domain could have a large predetermined number to make the content usable on many locations, or maybe a small predetermined number to discourage users to form very large domains. Import devices that provide large predetermined numbers could be sold at higher prices.

In an embodiment the content item is permitted to be copied freely and a single specimen of the right associated with the content item is permitted to exist in the domain. This provides great flexibility on where the content item can be accessed, but it prevents users from exercising rights beyond what they are allowed to.

In an embodiment every device in the domain has one or more domain identifiers and only communicates with other devices having at least one identical domain identifier. This is a surprisingly effective way to create a domain of mutually authenticated devices. Preferably there is a single domain identifier for every domain. A device can be a member of multiple domains, thus holding multiple domain identifiers. There could also be subdomains within the domain, and then devices hold the domain identifier for the "main" domain and the domain identifiers for the subdomains.

A new device that successfully authenticates itself to a device in the domain receives one or more of the one or more domain identifiers, preferably from a central controller device. This is optionally done conditional upon approval by a majority of the devices in the domain. If a particular device leaves or is removed from the domain, its domain identifier for that domain is deleted.

The domain identifier may comprise a list of device identifiers for devices that are members of the domain. This list can be compiled easily and so implementation of the domain identifier is straightforward. The domain identifier may comprise the device identifier of the central controller device.

Preferably the right associated with the content item comprises one of a render right, a transport right, a derivative work right and a utility right. The domain-specific right then preferably comprises one of a render right, a derivative work right and a utility right.

It is a ether object of the invention to provide a system comprising a set of mutually authenticated devices, said set making up a domain, the system comprising a central rights manager arranged for deriving one or more domain-specific rights from a right associated with the content item, the one or more domain-specific rights being bound to the domain and allowing the devices in the domain access to the content item.

Preferably every device in the domain has one or more domain identifiers and is arranged to only communicate with other devices having at least one identical domain identifier. In a variant of this embodiment a device in the domain is arranged to authenticate a new device and upon successful authentication to supply the one or more domain identifiers to the new device. The device arranged to authenticate the new device could be a central controller device and the one or more domain identifiers then comprise the device identifier of the central controller device.

BRIEF DESCRIPTION OF THE FIGURES

These and other aspects of the invention will be apparent from and elucidated with reference to the illustrative embodiments shown in the drawings, in which.

Throughout the figures, same reference numerals indicate similar or corresponding features. Some of the features indicated in the drawings are typically implemented in software, and as such represent software entities, such as software modules or objects.

System Architecture

Figure 1:
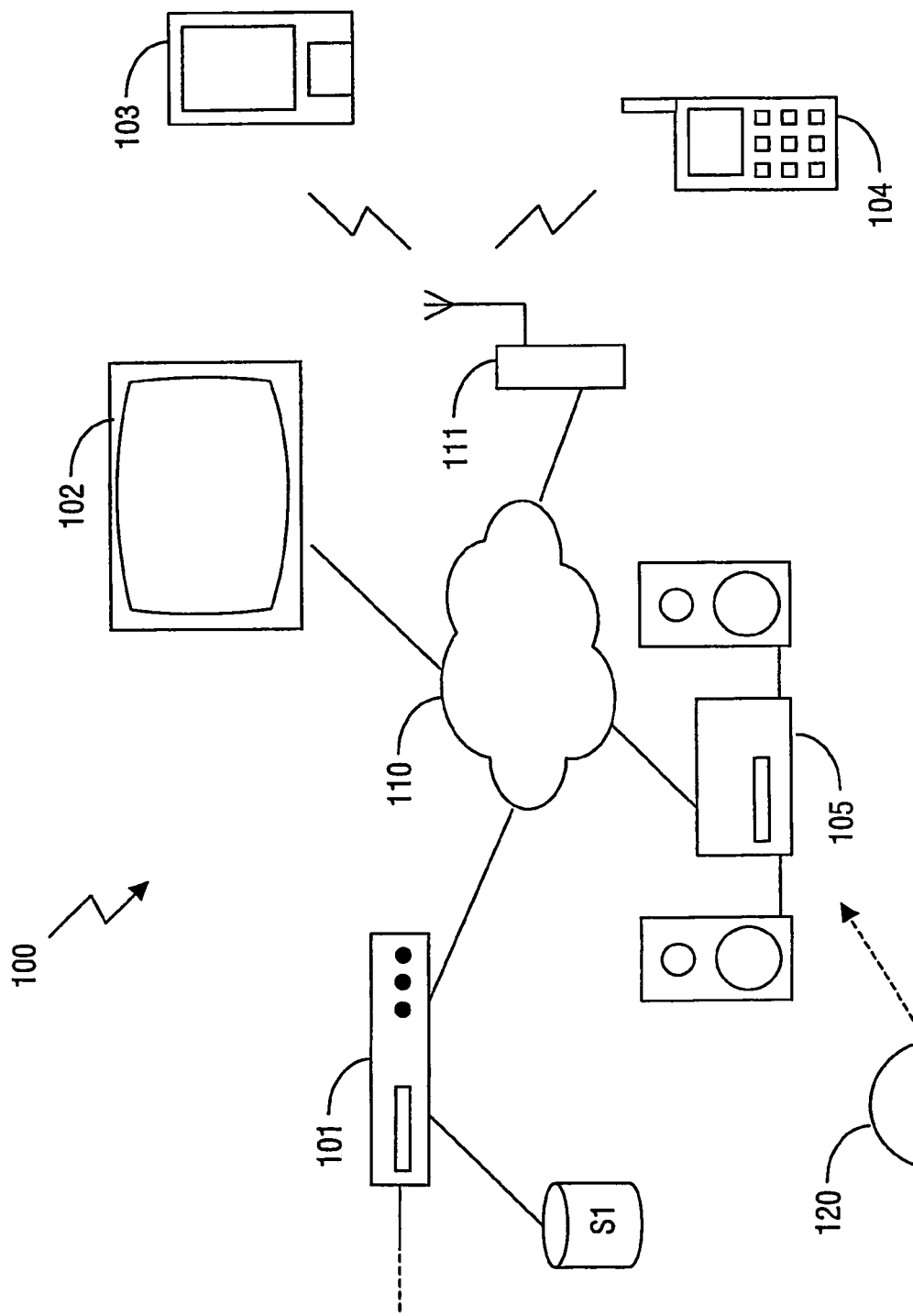
FIG. 1 schematically shows a system comprising devices interconnected via a network.

FIG. 1 schematically shows a system 100 comprising devices 101-105 interconnected via a network 110. In this embodiment, the system 100 is an in-home network. A typical digital home network includes a number of devices, e.g. a radio receiver, a tuner/decoder, a CD player, a pair of speakers, a television, a VCR, a tape deck, and so on. These devices are usually interconnected to allow one device, e.g. the television, to control another, e.g. the VCR. One device, such as e.g. the tuner/decoder or a set top box (STB), is usually the central device, providing central control over the others.

Content, which typically comprises things like music, songs, movies, TV programs, pictures, books and the likes, but which also includes interactive services, is received through a residential gateway or set top box 101. Content could also enter the home via other sources, such as storage media as discs or using portable devices. The source could be a connection to a broadband cable network, an Internet connection, a satellite downlink and so on. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium S1 such as a suitably large hard disk, allowing the recording and later playback of received content. The storage medium S1 could be a Personal Digital Recorder (PDR) of some kind, for example a DVD+RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a base station 111, for example using Bluetooth or IEEE 802.11b. The other devices are connected using a conventional wired connection. To allow the devices 101-105 to interact, several interoperability standards are available, which allow different devices to exchange messages and information and to control each other. One well-known standard is the Home Audio/Video Interoperability (HAVi) standard, version 1.0 of which was published in January 2000, and which is available on the Internet at the address http://www.havi.org/. Other well-known standards are the domestic digital bus (D2B) standard, a communications protocol described in IBC 1030 and Universal Plug and Play (http://www.upnp.org).

It is important to ensure that the devices 101-105 in the home network do not make unauthorized copies of the content. To do this, a security framework, typically referred to as a Digital Rights Management (DPM) system is necessary. In one such framework, the home network is divided conceptually in a conditional access (CA) domain and a copy protection (CP) domain. Typically, the sink is located in the CP domain. This ensures that when content is provided to the sink, no unauthorized copies of the content can be made because of the copy protection scheme in place in the CP domain. Devices in the CP domain may comprise a storage medium to make temporary copies, but such copies may not be exported from the CP domain. This framework is described in European patent application 01204668.6 by the same applicant as the present application.

Regardless of the specific approach chosen, all devices in the in-home network that implement the security framework do so in accordance with the implementation requirements. Using this framework, these devices can authenticate each other and distribute content securely. Access to the content is managed by the security system. This prevents the unprotected content from leaking "in the clear" to unauthorized devices and data originating from untrusted devices from entering the system.

Figure 2:
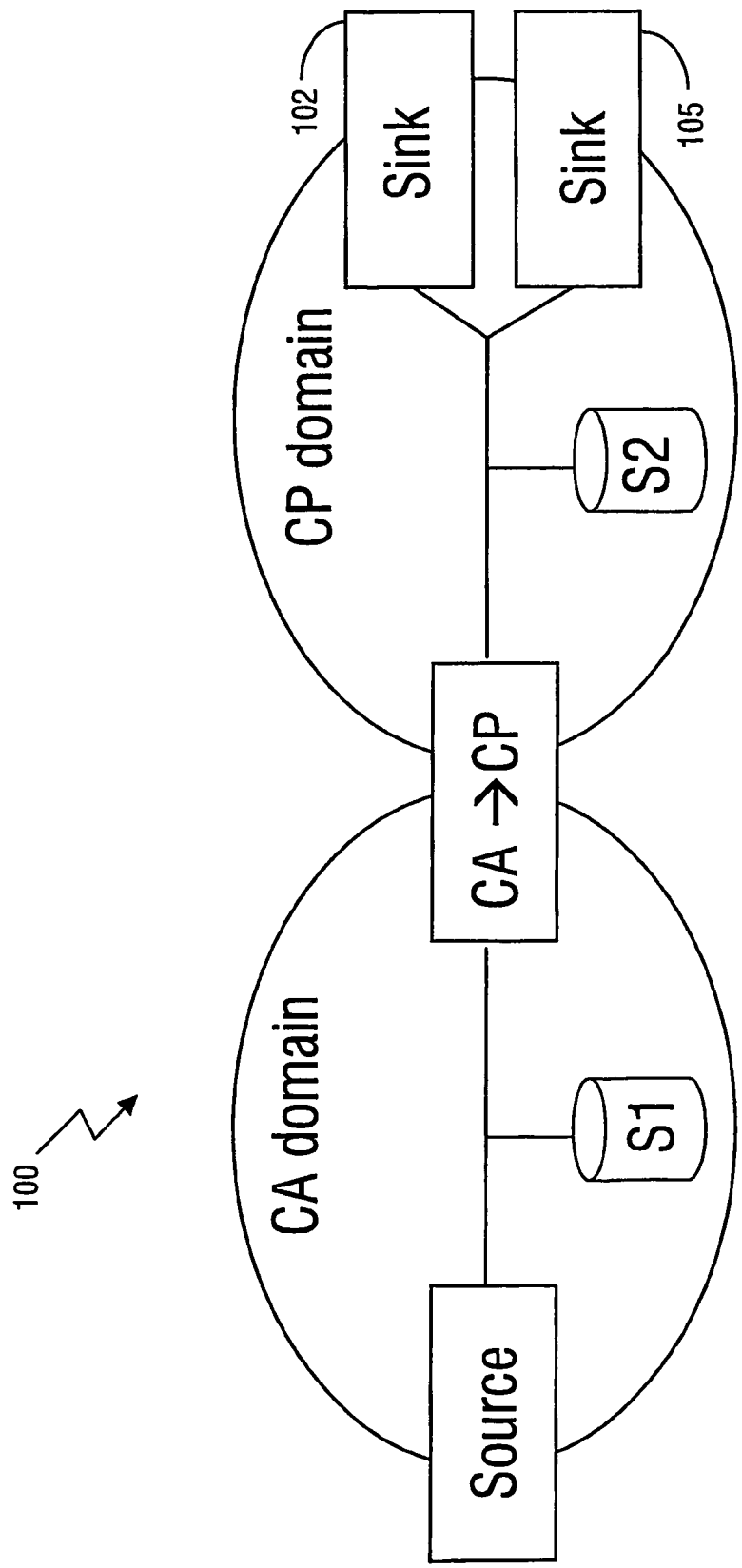
FIG. 2 shows the schematic division of the system 100 of FIG. 1 into a CA domain and a CP domain.

FIG. 2 shows the schematic division of the system 100 of FIG. 1 into a CA domain and a CP domain. In FIG. 2, the system 100 comprises a source, a sink, and two storage media S1 and S2. Most content enters the in-home network in the CA domain through the set-top box 101 (the source). Typically, the sinks, for instance the television system 102 and the audio playback device 105, are located in the CP domain. This ensures that when content is provided to the sink, no unauthorized copies of the content can be made because of the copy protection scheme in place in the CP domain.

A CA→CP gateway is provided between the CA and the CP domains. This gateway is responsible for letting content enter the CP domain. This process may require transcoding and/or (re-)encrypting the content, translating digital rights associated with the content to a format supported in the CP domain, and so on.

The CP domain comprises a storage medium S2, on which (temporary) copies of the content can be stored in accordance with the copy protection rules. These copies can be used for example for time-shifted playback of the content, but these copies may not be easily exported from the CP domain.

A device becomes part of the CP domain by connecting it to another device already in the CP domain, or by connecting it to the bus connecting these devices. To prevent rapid changing of CP domains, changing CP domains could be discouraged e.g. by ensuring that it must remain in that particular CP domain for a certain period of time, for example one day.

Authorized Domain Functions and Design Principles

The main functionality required for creation and maintenance of an AD comprises the following:

AD identification (This might also be considered as an AD management function)

Device check-in (this could also be called: device registration)

Device check-out (this could also be called: device de-registration)
Rights check-in
Rights check-out
Content check-in
Content check-out
Management of the AD:
  Content access
  Storage of rights in the domain
Some of the chosen design principles are:
No centralized management of the AD.
No a-priori restrictions in number of devices and amounts of content in the AD.
The following functional requirements were identified:
No a-priori restrictions on content access within the domain.
Only controlled content and/or rights exchange at the domain borders.
Only compliant devices are allowed in the domain (non-compliant devices are not considered).
The following non-functional requirements were identified:
The solution should work for portable mostly off-line devices.
The solution for an AD should be compliant with the typical DRM system architecture, i.e. the usage of digital rights is the basis for controlling access to content.

Authorized Domain (AD) Identification

One of the issues when implementing authorized domains is how to maintain an information structure that allows determining whether a device is part of a domain. It is important that content is not easily transferred from a device within the domain to a device outside the domain. Such checking out of content should be done under controlled circumstances, and may be restricted to 'particular devices. For example, a DVD+RW writer could be permitted to make copies of the content on a DVD rewritable disc, but a Personal Video Recorder inside the domain should not let a device outside the domain read unencrypted content stored on its built-in hard disk. We now present various ways to allow determining whether a device is a member of a particular authorized domain. Others are of course also possible.

In a first embodiment, an authorized domain is identified by means of a unique domain_id. This identifier is then stored in every device that is a member of the domain. If there is a need to have an overview of the complete set of domain member devices, an explicit list of device_ids that constitute the domain can be maintained. This list can be stored centrally in the domain.

Determining whether a device is a member of a particular authorized domain can now be done by simply checking whether the identifier for that particular domain has been stored in the device in question. The device must be also be compliant, of course.

In a second embodiment, an authorized domain is identified by means of the set of device_ids that constitute the domain. This set of device_ids is stored in one designated device within the domain (or, alternatively, outside the domain). Note that in this solution no explicit domain_id exists. This solution, however, seems less practical. In case two portable devices desire to communicate, while they have no connection with the central list, they cannot determine if the other also is a member of the AD.

In a variation of this embodiment the set of device_ids is stored in every device part of the domain. This solves the above problem that arises when two portable devices desire to communicate, but introduces a lot of management complexity and imposes relatively large storage requirements in all devices.

In a further variation of this embodiment the set of device_ids is stored in a number of specific devices part of the domain. Again, this introduces a lot of management complexity and imposes relatively large storage requirements in all devices.

Device Check-In

Figure 3:
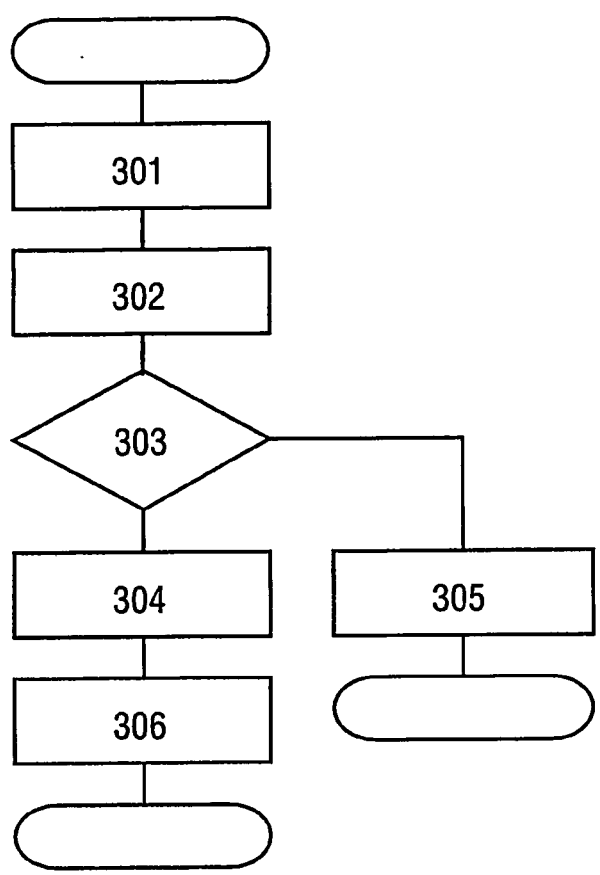
FIG. 3 shows a flow chart for an illustrative embodiment of a process to check in a device into the CP domain of FIG. 2.

Another important issue is how and when to check-in a compliant device. "Checking in" or "registration" refers to the process by which a device is accepted as part of an authorized domain. Only compliant devices should be accepted, to prevent content leaking from the authorized domain due to a malicious noncompliant device. An illustrative embodiment of this process is given as a flow chart in FIG. 3.

The check-in process is initiated by a user who, in step 301, connects the compliant device he wishes to add to another device that is already in the authorized domain. This is preferably a central server or controller for the authorized domain, if such a device exists. Other systems, for example SmartRight, allow initiating a check-in process by connecting the device to be added to any device already in the authorized domain. Of course "connecting" is not restricting to establishing physical connections using cables. Wireless connections, for example using BlueTooth or IEEE 802.11b can also be established.

After a network connection has been established, the next step 302 involves authentication of the new device by the device to which it is connected. If this authentication is successful, as determined in step 303, the new device becomes part of the authorized domain in step 304. Otherwise, the new device is rejected in step 305. Possibly also other conditions are checked, e.g. in case only a limited number of devices are allowed in the domain, another step would be to check that this limited number is not yet exceeded.

In case a central unique domain_id is used, as explained above, the new device in step 306 receives the domain_id from the central controller or from the device to which it is connected. If desired, any other device in the authorized domain could also supply the domain_id to the new device. One could for example designate particular types of devices has been allowed to distribute domain_ids to newly added devices.

As an extension, the newly added device could obtain the domain_id from any device in the domain, but the majority of the devices already in the domain should give permission. This way no single device (which could be corrupted by an adversary or make errors in for example its authentication procedure) can accept other devices into the domain.

In another embodiment a domain originator transmits the domain_id to the newly added device. In this embodiment, all compliant devices store a device_id and are equipped with storage space for a domain_id. The domain_id of the domain originator will be his device_id. Any other device added to the authorized domain then receives the domain_id from the domain originator.

Initially (in the factory), for a device, the domain_id will be set to the device_id. Any individual device then could be considered as an AD with a size of 1 device and the device is automatically the domain originator for that AD. When an AD grows, the originator device will lend his device_id to other devices as domain_id. The domain originator device can later on be recognized as the device with device_id=domain_id. Typically the originator device should be a large static device, e.g. the television set in the living room and not e.g. a portable device.

If two such large static devices are connected in one authorized domain, then a negotiation process may be needed to determine which one of the two should become the domain originator. Such a negotiation process can be implemented by requesting the user to designate the domain originator.

As this protocol requires the user to connect a device to the domain originator, the domain originator should be recognizable, by indicating this in the user interface of the device, for example, by showing an indicator on a display screen, activating a particular LED, and so on. The user could also add a physical indication, such as a special antenna or decorative element, or by changing its appearance in some other way, to the domain originator.

A device may only be checked in if the device is compliant and the device belongs to the household. Whether a device is compliant can easily be checked with known (authentication) mechanisms. The problems lie in determining if a device belongs to a household, i.e. to prevent that whole the world becomes member of the same domain. After all, the principle of authorized domains was introduced to allow some flexibility in handling content by consumers, not to allow unlimited content distribution worldwide.

The SmartRight system imposes a limitation on the number of devices in the domain. This solution is suitable for the case where all devices belonging to the domain are centrally registered. A problem with this solution is that it is badly scalable, and is not in line with our design principles.

Another solution is to impose a limitation for the number of sessions for playing back a certain piece of content from the AD domain controller. A problem with this solution that it is not very suitable for off-line portable devices, and is not in line with our design principles. This solution is described in European patent application serial number 02009651.7 by the same applicant as the present application.

Yet another solution imposes a limitation on the number of authorized domain rights (e.g. playback rights, see below for a more extensive discussion of authorized domain rights) in the domain. This way, for example a playback right can only be used once at a time. This solution can be implemented de-centrally and therefore fits our design principles. A possible disadvantage, however, is that we now have a copy management scheme within a copy management scheme. (This solution preferably should work together with a device registration scheme.)

In another embodiment an external third party enables the device to work within a specific domain. Such message can be sent over a broadcast channel, the Internet, or using storage media like floppy discs, flash cards, smart cards, etc. Although this is a valid approach, the implementation is very different from the model expressed in this document and will not be addressed further.

Device Check-Out

Another important aspect of authorized domains is how and when to check-out a compliant device. "Checking out" or "deregistration" refers to the process by which a device that is part of the authorized domain can leave the authorized domain. If an authorized domain is identified by means of a unique domain_id, then checking out a device in the authorized domain can be implemented by deleting the domain_id stored in the device.

When a device checks out from an authorized domain we have a situation where in fact two authorized domains exist: the original authorized domain and the device that just left, which can be considered as an authorized domain in itself. At this point a distribution of the (XAD) rights (see later for explanation of type of rights) between these two authorized domains has to take place (AD rights belonging to checked-out XAD rights must be deleted, e.g. by sending a revocation message into the domain.). This will be implemented by means of (user-) controlled rights check-out and check-in.

Digital Rights Management

Content inside the authorized domain is still subject to digital rights management rules. The digital rights associated with content are typically received together with the content as it enters the authorized domain. For example, the rights could be present in a license file downloaded together with the content from a Website, or be part of the MPEG-2 stream received over a cable network.

Rights can also be purchased separately. A consumer could for example purchase a carrier such as a DVD disc in a store. The content on this disc can only be played back if he separately purchases a playback right, for example on the website of the content owner. The playback right in question could be limited in time, forcing the consumer to purchase new playback rights at regular intervals.

It is to be expected that the rights are distributed in proprietary formats, although of course rights might also already be distributed in AD format. Rights may also originate from other ADs, i.e. inter-AD communication. This makes it necessary to convert the rights to the format used inside the authorized domain. This is referred to as "checking in a right". Some requirements on rights check-in are:

Only accept rights that can be enforced by the AD.

Only accept rights in case obligations are acceptable (We will only consider the case were there are a limited number of identifiable obligations as this allows easy and simple implementation using enumeration.).

Only accept rights if content related to right is acceptable (certain content, e.g. adult movies, might be unacceptable in a household with children).

AD rights management preferably involves three types of actions:

AD rights identification: How to find out to which domain a right belongs?

Check-in of rights in to the AD: How to add a right to a domain?

Checkout of rights from the AD: How to delete/transfer a right from a domain?

Right identification may operate in different ways:

i. A common AD key may encrypt the rights in the domain. Only devices which posses the common key can use the content key in the right.

ii. A right may contain an AD identifier. Compliant devices will only "use" rights with the correct AD identifier.

iii. A right is implicitly bound to the domain, i.e. once entered it cannot leave the domain. It is protected by devices and on secure interfaces.

An advantage of method i and ii is that it is very clear to which domain rights belong. A disadvantage, however, is that rights need to be changed (different identifier/different encryption), whenever changes occur in the set of devices in the domain and when rights are checked-in/out.

A right can only be checked in if it is compliant to the domain and was allowed to be "checked-out" from its origin. The typical origin of a right will be a DRM or pay-TV system. Rights check-out may only occur when allowed by the right. Correct handling of rights is ensured by the compliance of devices handling the right.

Figure 4:
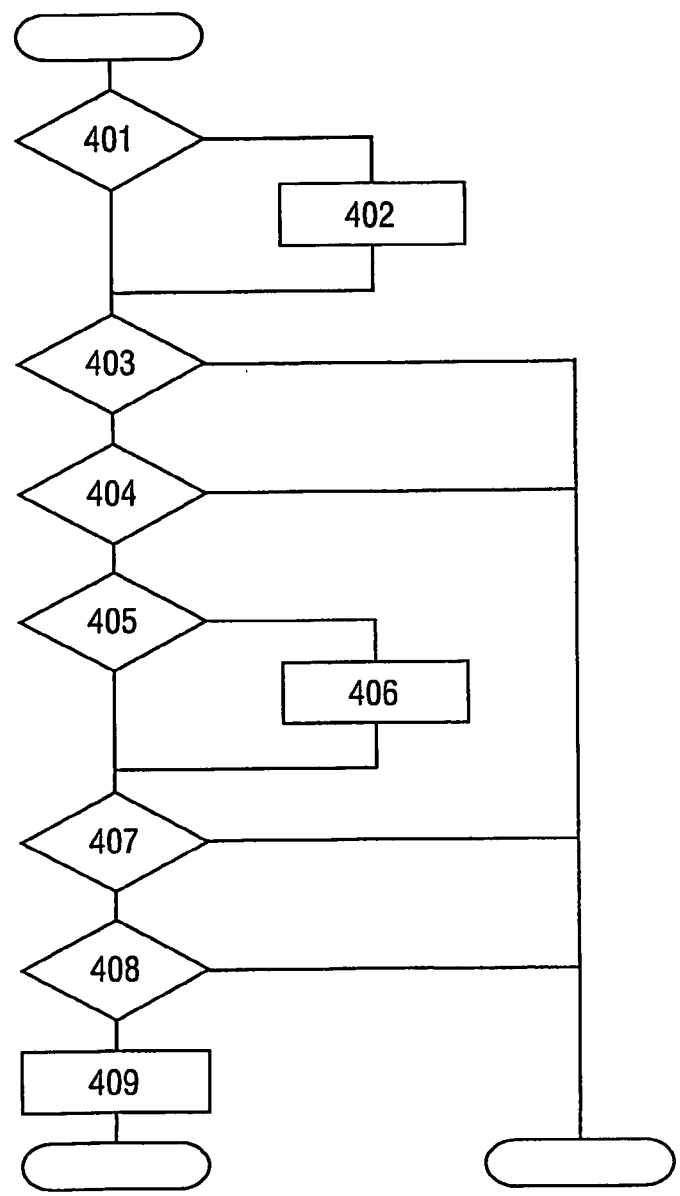
FIG. 4 shows a flow chart for an illustrative embodiment of a process to check in digital rights into the CP domain of FIG. 2.

An illustrative embodiment of a process to check in digital rights in accordance with the present invention is given in the flow chart of FIG. 4. The first step 401 is to determine whether the rights are in a proprietary format. If so, the next step 402 is to convert the rights from the proprietary format to the AD format. If conversion is not possible, another entity should convert or interpret the right for the AD. If this also fails the conversion has failed and the right will be refused.

Having obtained the digital rights in the AD format, the next steps 403, 404, 405, 407 and 408 are to check whether:
a) the right is legal, i.e. is it approved by the right/license authority (step 403),
b) the transaction is legal, i.e. am I allowed to receive/accept this right (step 404),
c) the right can be enforced by the AD (step 405); if not refuse or downgrade the right (step 406),
d) the obligations are acceptable to the AD or the AD owner (step 407),
e) the right refers to content that the AD is willing to accept (step 408).

If all these checks are passed, the right is added in step 409 to the AD under the control of the Rights Manager in the AD. This Rights Manager may not be a single identifiable entity, but can be completely distributed.

Of course nothing prevents the system to also maintain hold of the rights on the content in the original DRM system. So when the rights were downgraded, the user could still make use of the complete rights using the original DRM system.

We will now further concentrate on point a) and b). Items c), d), e) are more related to the contents of the rights and content and less to domain management and will therefore not be further elaborated on.

In the case II under a), we consider a right legal if 1) it contains an authenticity mark by the right/license authority or by another approved party (or device) and 2) it originates from an approved/compliant device. We will not further elaborate on this here, as techniques to achieve this are known.

In the case II under b), we first need to know the different origins of rights. Some example ways to obtain rights are:
i. Rights can be imported via a wired or wireless domain interface.
ii. Rights can piggyback on a (packaged) medium
iii. Rights can piggyback on device
iv. Rights can be generated in the domain itself. International patent application WO 02/065255 describes how rights can be generated when importing content. Some extensions are described in European patent application serial number 02076209.2 .

Given these different origins of rights, we consider a transaction legal if:
transmitting the right in question to the present domain is allowed, i.e. the right is not bound to a specific domain, or
the right originates from a compliant transmission/communication channel (e.g. Secure Authenticated Channel, SAC), a compliant device, a compliant medium, or from a compliant right generating device (e.g. a compliant A/D converter).

Given the points above we have rights that are bound to a domain and that we have rights which can be transferred to and between domains. We therefore introduce two types of rights: XAD rights (or cross-AD rights) and AD rights. AD rights belong to one AD. XAD rights can be transferred between ADs (if allowed).

The following type of rights can be recognized:
Render rights, e.g. view, play, print.
Transport rights, e.g. copy, move, loan.
Derivative work rights, e.g. extract, embed, edit.
Utility rights, e.g. backup, cache, data integrity
The following attributes can be attached to rights:
Consideration: Whatever the user has to give in return.
Extents: How long; how many, where, etc.
User attributes, Subscribers, age, sex, etc.

An AD right can be any type of right, except for a transport type of right. That is, an AD right cannot be a right for transport to other ADs. Within the AD render rights may for example be copied. An XAD right can be any type of right. AD rights are only meant for use within the authorized domain and are derived from the XAD right. Initially XAD rights originate from the rights owner. If an XAD right is checked-in in to an authorized domain, AD rights can be derived from this. AD rights may be multiplied at will in the domain, but they may never leave the domain.

The XAD right will be used to control inter domain communication. For ease of management reasons only one copy of the XAD right is preferably allowed (unless copies are made for back-up reasons). However, if XAD rights leave the domain, the derived AD rights in the original domain must be deleted. This can be done by sending a revocation messages from the device taking along the XAD right.

Now we have the inventive solution for rights check-in: Only allow the checking in of XAD rights and then only if they originate from a compliant transmission/communication/device/medium/generator.

Now we also have the inventive solution for rights check-out: only allow checking out XAD rights from a domain. Export of AD rights from the domain is forbidden.

Content Management

Content typically comprises things like music, songs, movies, TV programs, pictures, books and the likes, but could also include interactive services. We distinguish between three types of content:
Encrypted content (digital format)
Un-encrypted but watermarked content (both analog as digital format)
Unprotected content (both analog as digital format)

In an authorized domain digital rights control the use of content. Without a right, content is useless in the domain. The operation check-in of digital protected content in the AD is therefore not relevant to the present invention and will not be discussed further.

In case we have watermarked and unencrypted content, the watermark should be checked by the importing device to see if content check-in is allowed and under what conditions. In case that check-in is allowed, the content is imported and an accompanying right is generated. After importing the content, it is preferably encrypted to protect it.

In case of unprotected content, the content shall be imported and an accompanying right will be generated.

An alternative approach is to let the authorized domain enforce the limitations set upon the content; some rights are granted and some are not. In the case of unprotected content (content in which by law or license no usage restrictions can be detected), such an enforcement subsystem is not needed. As such the content can move freely without restrictions and does not have to be imported.

With regards to content check-out, we observe that typically digital format content is encrypted and cannot be used elsewhere (without the right). Flowing away of content in analog format can anyhow not be prevented. Such content can of course contain watermarks, or watermarks can be added to the analogue content. A special case of using watermarks is to always indicate copy-never, thereby preventing reinsertion of analogue content. The issue of content check-out will not be further discussed here.

When the content rights are checked-out, the content may need to be re-encrypted. As the protection of the content and the enforcement of the AD is primarily done by controlling the rights, one could say that the content did not enter the AD, only the rights do.

Authorized Domain Management

Content can only be accessed in the domain if the correct AD right is available. The AD right is derived from an available XAD right, as explained above. An AD right is valid in the complete domain, and is non-transferable between domains. The AD right may be allowed to multiply inside the domain. That means that any device in the domain that needs the right will have unconditional access to the right. Rights can be stored anywhere in the domain. A method therefore must be present to locate and obtain such a right. Different strategies can be applied for this. These strategies can generally be divided into centralized storage methods and decentralized storage methods.

In the case of centralized storage of rights there is a central rights manager that will be contacted to obtain a specific right. In the case of decentralized storage of the rights a distributed search mechanism is used to locate and obtain the right within the domain. Note that in practice rights should be located on devices that are mostly/always on and that rights are most likely stored on the same device as the content.

For some (AD) rights it is acceptable to have multiple instances/copies of the right (in the domain), for example the play unlimited right (and can be stored anywhere in the domain). Typically, rights containing some counting mechanism to restricted e.g. the number of times to play or copy cannot be replicated in a system without additional precautions. One way of addressing part of this problem is by generating a number of "one shot use rights". In the case of "copy once", one "copy right" will be generated. This right will be consumed (deleted) when the content is copied to another domain. As the right represents a one time action, is should be protected against copying but may move freely within the domain.

It can be advantageous to store the rights with the content. This would make it easy to locate the right (if the content is available, the right is also available). Another advantage is that the storage space required for the rights scales with the storage available for storing content. The major disadvantage is that it becomes difficult to support rights with some kind of counting mechanism.

Packaged media, such as Digital Versatile Discs (DVDs) or compact discs, deserve special mention. We assume that a packaged (ROM) medium will have serial copy management on board (which is the source of the XAD rights), unless it is possible to include a counter mechanism on e.g. a disc to support rights like copy once. An example of such a mechanism can be realized using Chip-in-Disc type mechanisms, such as described in international patent application WO 02/17316 .

In a preferred embodiment, a packaged medium may only contain XAD rights. If the medium contains AD rights it might be impossible to delete them afterwards if the corresponding XAD right is removed from the domain. Also, consumers expect that packaged media (e.g. DVD+RW) play anywhere, and in any compliant device.

In case of "copy-no-more" we could require that the disc only playback (i.e. renders) on the domain originator device, i.e. the device for which holds device_id=domain_id or on the disc reader (Thus not playable inside the whole domain!). This might stimulate original media sales. Other use rules are possible depending on the setting of the serial copy management bits.

To summarize, some advantageous embodiments, which may each be combined with one or more others or deployed stand-alone, of the present invention are:

1. Using domain_ids in devices to identify devices in a domain. In this case all AD compliant devices need to have storage space to store a domain_id number.
2. To limit domain size, a device is checked-in at the domain originator device and when it is in close proximity to this device.
3. The size of the domain is limited by limiting the amount of playback rights in the domain.
4. Two type of rights in the AD: XAD rights for transfer between domains and AD rights for use inside domain.
5. When checking-out a device, its domain_id is deleted, for example by making it equal to the device_id again, and the AD rights residing on the device are deleted as well. This prevents the attack of exporting content from the domain by checking-out a device.
6. When checking-out a device containing XAD rights, a revocation message for corresponding AD rights is sent into the domain, or use hart beat (white list) mechanism. In this case portable devices (not always connected to the network) need to obtain renewed AD rights at regular intervals. This mechanism hinders the attack of trying to leave behind content/rights in a domain by checking out a device. It also prevents illegal distribution of content by checking in a device, storing content on it, and subsequently checking out the device and checking in the device in another authorized domain.
7. To stimulate sales of original packaged media, only allow derivation of AD rights from the XAD (serial copy management right) on a packaged medium if it the medium indicates "one-generation-copy" allowed (and not "no-more-copies"). This means that it is not possible to derive AD rights from a "no-more-copies" XAD right and that the content on the medium can only be played in the domain if the medium is present in the domain.
8. A limited number of use rights is implemented by generating "one shot rights" or "rights tokens".

It should be noted that the above-mentioned embodiments illustrate rather than limit the invention, and that those skilled in the art will be able to design many alternative embodiments without departing from the scope of the appended claims. The system 100, representing a home network, is of course not the only situation in which authorized domains are useful.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlling access to a content item in a home network of mutually authenticated devices, a digital right being associated with the content item, the mutually authenticated devices implementing a Digital Rights Management system managing access to the content, at least one of the mutually authenticated devices being capable of accessing the content item, devices of the mutually authenticated devices being arranged to be members of multiple networks and to store multiple corresponding network identifiers, the method comprising acts of:

identifying a home network by means of a unique domain identifier, the unique domain identifier being stored in all devices of the home network;

deriving, in the home network, one or more domain-specific rights from the digital right associated with the content item; and binding the one or more domain-specific rights to the home network from within the home network, thereby granting access to the content item to all the devices in the home network, wherein the one or more domain-specific rights associated with the content item are exercisable a predetermined number of times, and wherein the method further comprises the acts of:

deleting the domain-specific right for the home network from a particular device of the mutually authenticated devices if the particular device is removed from the home network; and sending a revocation message into the home network if the domain-specific right associated with the content item is revoked or removed from the home network, and deleting the derived domain-specific right.

2. The method of claim 1, comprising an act of importing the right associated with the content item into the home network only when the right associated with the content item originated from a compliant device.

3. The method of claim 1, wherein the content item is stored on a removable storage medium together with the right associated with the content item, the method comprising an act of deriving the one or more domain-specific rights only when the removable storage medium indicates that making a one-generation copy is permitted.

4. The method of claim 1, wherein the content item is stored on a removable storage medium together with the right associated with the content item, the method comprising an act of deriving the one or more domain-specific rights only when the removable storage medium indicates that making a single copy of the content item is permitted.

5. The method of claim 1, wherein the content item is stored on a removable storage medium together with the right associated with the content item and the one or more domain-specific rights are derived even though the removable storage medium indicates that making a copy of the content item is not permitted.

6. The method of claim 1, wherein the content item is stored on a removable storage medium together with the right associated with the content item, and the one or more domain-specific rights are derived even though the removable storage medium indicates that making a copy of the content item is no longer permitted.

7. The method of claim 1, wherein each domain-specific right associated with the content item is a right that can be exercised a predetermined number of times, and in which the number of domain-specific rights derived from the right associated with the content item corresponds to the predetermined number.

8. The method of claim 7, wherein the predetermined number of times the one or more domain-specific rights can be exercised is one.

9. The method of claim 7, wherein said method further comprises an act of determining the predetermined number of times the one or more domain-specific rights can be exercised by the right associated with the content item.

10. The method of claim 7, wherein the predetermined number of times the one or more domain-specific rights can be exercised is a characteristic of the home network.

11. The method of claim 7, wherein the predetermined number of times the one or more domain-specific rights can be exercised is a characteristic of the device through which the content item is imported into the home network.

12. The method of claim 1, wherein the content item is permitted to be copied freely and a single specimen of a right associated with the content item is permitted to exist in the home network.

13. The method of claim 1, wherein every device in the home network has one or more home network identifiers and only communicates with other devices having at least one identical home network identifier.

14. The method of claim 13, comprising acts of authenticating a new device to an existing device in the home network of mutually authenticated devices and the new device receiving one or more of the one or more home network identifiers.

15. The method of claim 14, wherein every device in the home network having a device identifier, the one or more home network identifiers comprising a list of device identifiers for devices that are members of the home network.

16. The method of claim 14, wherein the home network of mutually authenticated devices further comprises a central controller device, the method comprising an act of the new device receiving the one or more of the one or more home network identifiers from the central controller device.

17. The method of claim 16, comprising an act of the new device receiving the one or more of the one or more home network identifiers from the central controller device conditional upon approval by a majority of the devices in the home network.

18. The method of claim 16, wherein the one or more home network identifiers comprise the device identifier of the central controller device.

19. The method of claim 1, wherein the number of domain-specific rights is limited to a predetermined amount.

20. The method of claim 19, wherein the predetermined amount is determined by the right associated with the content item.

21. The method of claim 1, wherein the number of domain-specific rights relating to playback of the content item is limited to a predetermined amount.

22. A system comprising a home network of mutually authenticated devices, the devices implementing a Digital Rights Management system managing access to a content item, a digital right being associated with the content item, devices of the mutually authenticated devices being arranged to be members of multiple domains and to store multiple corresponding domain identifiers, the system comprising:

a central rights manager for identifying a home network by means of a unique domain identifier, the unique domain identifier being stored in all devices of the home network, deriving one or more domain-specific rights from the digital right associated with a the content item for binding the one or more domain-specific rights to the home network from within the home network and granting all the devices in the home network access to the content item, wherein the one or more domain-specific rights associated with the content item are exercisable a predetermined number of times, and wherein the central rights manager deletes the domain-specific right for the home network from a particular device of the mutually authenticated devices if the particular device is removed from the home network, and sends a revocation message into the home network if the domain-specific right associated with the content item is revoked or removed from the home network, and deletes the derived domain-specific right.

23. The system of claim 22, wherein every device in the home network has one or more home network identifiers and is arranged to only communicate with other devices having at least one identical home network identifier.

24. The system of claim 23, wherein at least one device in the home network is arranged to authenticate a new device and upon successful authentication to supply the one or more home network identifiers to the new device.

25. The system of claim 24, wherein the at least one device arranged to authenticate the new device is a central controller device and the one or more home network identifiers comprise the device identifier of the central controller device.

* * * * *